United States Patent [19]

Kamata

[11] Patent Number: 6,081,667
[45] Date of Patent: Jun. 27, 2000

[54] LENS-FITTED FILM UNIT SYSTEM USING NEGATIVE RETURN CARTRIDGE

[75] Inventor: Kazuo Kamata, Kanagawa, Japan

[73] Assignee: Fuji Photo Film Co., Ltd., Kanagawa, Japan

[21] Appl. No.: 09/200,412

[22] Filed: Nov. 27, 1998

Related U.S. Application Data

[63] Continuation of application No. 08/616,099, Mar. 14, 1996, abandoned.

[30] Foreign Application Priority Data

Mar. 15, 1995 [EP] European Pat. Off. ............... 7-055896

[51] Int. Cl.[7] .................................................. G03B 17/26
[52] U.S. Cl. ............................................. 396/6; 396/512
[58] Field of Search ............................. 396/6, 512, 513, 396/514, 516, 535, 538

[56] References Cited

U.S. PATENT DOCUMENTS 4,831,398  5/1989  Nakayama et al. .
5,083,155  1/1992  Kataoka et al. .
5,329,330  7/1994  Sakai et al. .
5,384,613  1/1995  Cloutier et al. .
5,394,211  2/1995  Kamata .
5,471,265  11/1995  Shibata et al. ............................ 396/60
5,495,310  2/1996  Takatori .
5,602,611  2/1997  Takatori et al. ........................ 396/513

FOREIGN PATENT DOCUMENTS

0 387 626  9/1990  European Pat. Off. .

Primary Examiner—Howard B. Blankenship
Attorney, Agent, or Firm—Young & Thompson

[57] ABSTRACT

A lens-fitted film unit pre-loaded with a roll of a photographic film strip of a type having a row of perforations formed in a lengthwise margin of the film strip for unconditionally delimiting respective image areas of the film strip at regular intervals of which one end is detachably engaged by a spool retainer. After exposure and development, the entire length of the film strip is rolled in a negative return cartridge pertinently prepared to the requirements for newly developed Advanced Photo System including printing and returned to customers for storage and for ordering extra prints.

17 Claims, 8 Drawing Sheets

LENS-FITTED FILM UNIT SYSTEM USING NEGATIVE RETURN CARTRIDGE

CROSS-REFERENCE TO RELATED APPLICATIONS

This application is a continuation of application Ser. No. 08/616,099, filed Mar. 14, 1996, now abandoned.

BACKGROUND OF THE INVENTION

1. Field of the Invention

The present invention relates to a lens-fitted film unit, and. more particularly, to a lens-fitted film unit which contains a roll of film with image frames defined by an alternate arrangement of perforations available for an integrated photographic system from exposure to reprinting.

2. Description of Related Art

Lens fitted film units comprise a simple taking lens and an exposure mechanism incorporated in a unit casing as well as a patrone or cartridge containing a roll of film. Such a lens fitted film unit, for instance "Utsurundesu Super 800" or "Quick Snap" (both are trade names), has been widely used. These types of lens fitted film units are low-priced and intended to let everyone find pleasure in taking pictures whenever and wherever he or she wants. After exposures of a roll of film, the lens fitted film unit with the exposed film left inside is sent to photoshops for development and printing.

In recent years, what is called Advanced Photo System in which a new film format is employed has been announced. The new photographic system includes a sophisticated development and printing system and a new, small sized format of roll film contained in a unique patrone or cartridge prepared according to the sophisticated development and printing system. This new format film strip, which is intended to be used in appropriate cameras like conventional 35 mm format cameras but quite different in attributes from the conventional 135 size films, has an alternate arrangement of two different sizes of perforations in a lengthwise margin, namely framing pairs of adjacent different size perforations which are arranged at short regular intervals and each pair of which defines an image frame of the film strip therebetween and spacing pairs of adjacent different size perforations which are arranged at long regular intervals and each pair of which defines a space between adjacent exposure image frames. During printing, the utilization is made of the perforations to automatically locate each image frame of the film strip in correct position. For greater details of this new photographic system, reference may be had to a report entitled "The Entire Picture of New Standard Film APS", in the March issue of the "Photographic Industry", 1996.

The new photographic system has been developed on the assumption that exposed image frames of a film must be at predetermined distances from a reference position of the film. In other words, The new photographic system has a requirement that a film must be exposed at approximately definite frame positions unlike the conventional photoprocessing systems which allow the conventional 135 size films to have image frames exposed at relative positions. Positional inconsistency of exposed image frames causes troubles during printing by means of printing machines designed and furnished in conformity with the requirements for the new photographic systems. In order to meet the demand of the new photographic system, the new format film must be contained in a pertinently prepared patrone or cartridge of which details and features are described in Japanese Unexamined Patent Publication No. 6-266053. The most distinctive functional features of this cartridge are the mechanical and magnetic entry of exposure and processing data which are recorded on the film strip and/or the cartridge itself and are available during processing and printing, a film drive mechanism including a spool and a light lock door. Further, it is also featured that the processed film is returned in the original cartridge to the customer. This unique film cartridge enables, for instance, to display all pictures of a negative film contained therein on a home TV like a video tape by the utilization of a negative player designed for the new photographic system and to import images of a negative film contained therein into a personal computer by the utilization of an image scanner. For these image displays, the cartridge is handled just like a video tape cartridge.

When loading the cartridge with a roll of film entirely rolled therein in a camera, the light lock door is turned to open the egress/ingress slot with the result of allowing the film to be advanced and rewound by means of the film drive mechanism which in turn cooperates with a film wind/rewind mechanism of the camera pertinently designed for use with the cartridge. Specifically, if the camera is of a pre-wind type, it automatically forces the film strip out and winds it on a spool in a film take-up chamber at opposite side of the camera interior to the cartridge chamber immediately after loading the cartridge and rewinds the film strip by one image frame every exposure. When the film cartridge is intended to be unloaded, the camera rewinds the film strip entirely within the film cartridge in spite of full exposures or partial exposures of the film strip. Immediately before the film cartridge is unloaded out of the camera, the light lock door is automatically actuated to close the egress/ingress slot so as to provide a reliable light-sealed interior of the film cartridge. In this manner, the film cartridge used in the new photographic system furnishes access-free film loading and unloading, which means it is unnecessary for the user to deal with the film leader with the user's hand for loading and unloading.

The film cartridge may be reloaded in a camera to continue another part of exposures, or otherwise is put to a photoshop for development and printing. During film processing the data entered through the data entry mechanism are used, which is always preferable for easy processing operations and high quality pictures.

After development and/or printing, the whole length of film strip is returned in the original cartridge to the customer. As compared with the conventional photoprocessing systems in which film strips are cut into several pieces and returned in a folding negative holder, returning the negative film in the cartridge offers easy storage and handling of the negative. For reprinting extra copies of pictures from the negative, the cartridge is taken to a photoshop and enables the exposure and processing data to be available at any photoshop.

While the advantageous features of the new photographic system are available for lens-fitted film units, various constraints must be imposed on built-in and united mechanisms of the lens-fitted film unit approaching the new photographic system, in particular the unique film cartridge, in all aspects including cost performance. As previously mentioned, the film cartridge is equipped with various mechanisms, including the film drive mechanism, the data entry mechanism and the light lock door, which boost up manufacturing costs as compared with the conventional 135 mm size film cartridges. If a lens-fitted film unit is intended to make use of the distinctive feature of the unique film cartridge and, in addition, the features of the new photographic system, various precise mechanisms associated with the cartridge mechanisms must be installed in the lens-fitted film unit. In order for the lens-fitted film unit after use to allow the film cartridge to be taken out in an open room, a light lock door operating mechanism is essentially incorporated in the lens-fitted film unit, resulting in a rise in the price of the lens-fitted film unit of which predominant advantages lie in low price and simple structure.

SUMMARY OF THE INVENTION

It is an object of the present invention to provide a lens-fitted film unit incorporating a roll of film strip of a type having a row of perforations formed in a lengthwise margin of the film strip so as to unconditionally delimit respective image areas of the film strip at regular intervals and a pair of retaining holes in close proximity to a trailing end of the film strip which allows customers to enjoy the advantages features peculiar to the new photographic system.

It is another object of the present invention to provide a film strip handling system organized to consistently handle the entire length of a film strip without being cut into pieces from exposure to return of the negative to customers.

The foregoing objects of the invention are achieved by providing a lens-fitted film unit which is pre-loaded with a roll of a photographic film strip of a type having a row of perforations formed in a lengthwise margin of the film strip for unconditionally delimiting respective image areas of the film strip at regular intervals and a pair of retaining holes in close proximity to an trailing end of the film strip under strict control at the manufacture and which is contained, after development, into a negative return cartridge equipped with a spool having a retainer for detachably retaining one trailing end of a negative strip, which has been prepared according to the new photographic system. The lens-fitted film unit includes a light-sealed film container and a film wind-up spool having a retainer with the same function as the retainer of the spool of the negative return cartridge. The entire length of film strip separated from the lens-fitted film unit after exposures is engaged with the spool retainer of the negative return cartridge and rolled in the negative return cartridge. The utilization of the negative return cartridge allows customers to enjoy the incomparable advantages offered by the new photographic system.

According to another aspect of the invention, an organized photographic film strip handling system for handling the new type of a roll of film strip used in the new photographic system comprises a lens-fitted film unit with a roll of unexposed film strip pre-loaded therein and equipped with exposure means for exposure of said film strip and a negative return cartridge for receiving the film strip separated from the lens-fitted film unit and developed, the negative return cartridge being equipped with a spool which has a retainer for detachably engaging the trailing end of the film strip through the retaining holes and is rotatable inside the negative cartridge in opposite directions so as to unwind and force the film strip out of the interior of the negative return cartridge and to wind up the film strip into the interior of the negative return cartridge. The lens fitted film unit comprises a light-sealed film container formed with a film wind-up chamber and a film supply chamber disposed at opposite sides of the light-sealed film container and equipped with exposure means disposed between the film wind-up chamber and the film supply chamber, a wind-up spool placed in the film wind-up chamber which has a film retainer of the same in function as the retainer of the spool of the negative return cartridge for detachably retaining the trailing end of the film strip through the retaining holes, film wind-up means for rotating the wind-up spool to wind up the film strip on the wind-up spool after every exposure of the film strip.

The utilization may be made of a film cartridge previously incorporated in the lens-fitted film unit, in which the wind-up spool is held for revolution and into which the film strip is rolled after every exposure. The utilization of the film cartridge eliminates handling the exposed film strip in a dark room. In this instance, the film cartridge is equipped with light sealing cloth strips, such as felt strips, at a film egress/ingress slot for sealing the film cartridge light-tightly at least when the entire length of film strip is rolled within the film cartridge.

BRIEF DESCRIPTION OF THE DRAWINGS

The above and other objects and features of the present invention will be clearly understood from the following description with respect to a preferred embodiment thereof when considered in conjunction with the accompanying drawings, in which.

DETAILED DESCRIPTION OF THE EMBODIMENTS

Figure 2:
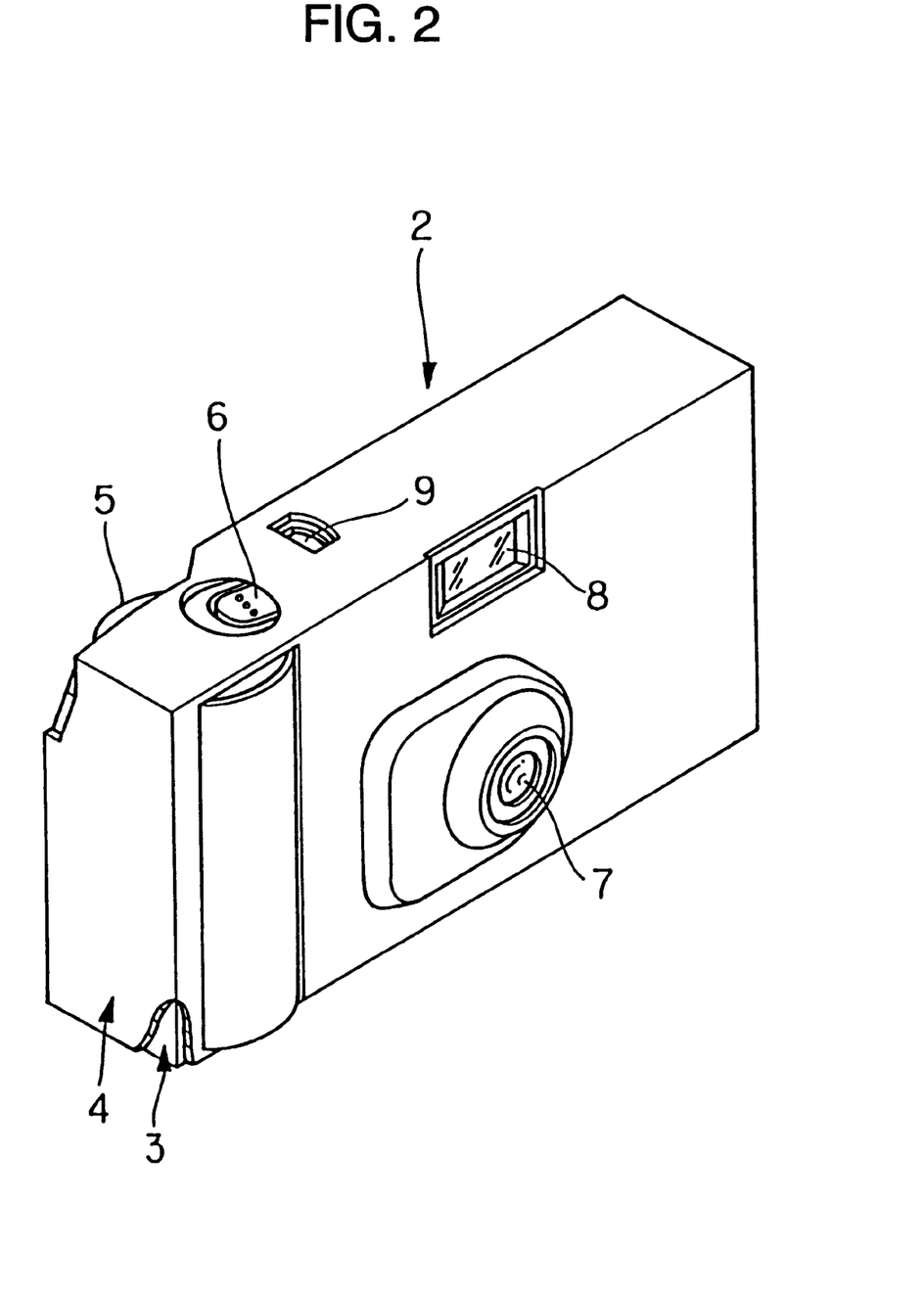
FIG. 2 is a perspective view of the lens-fitted film unit.

Referring to the drawings in detail, and in particular to FIG. 2, a single use or disposable lens-fitted film unit 2 is shown. This lens-fitted film unit 2 has a roll of new format of film strip 21 loaded in a light sealed casing. After exposures of all available image frames of the film strip, the lens-fitted film unit 2 is taken to a photoshop for development and printing. At the photoshop, the whole length of film strip removed from the lens-fitted film unit 2 is handled as it is, the negative film strip is returned in a cartridge to the customer. The cartridge, which meets the design specifications of the new photographic system and is available in processing according to the new photographic system, is hereafter referred to as a negative return cartridge. Since the negative return cartridge has been returned to the customer, it allows the customer to enjoy the advantages peculiar to the new photographic system.

Figure 4:
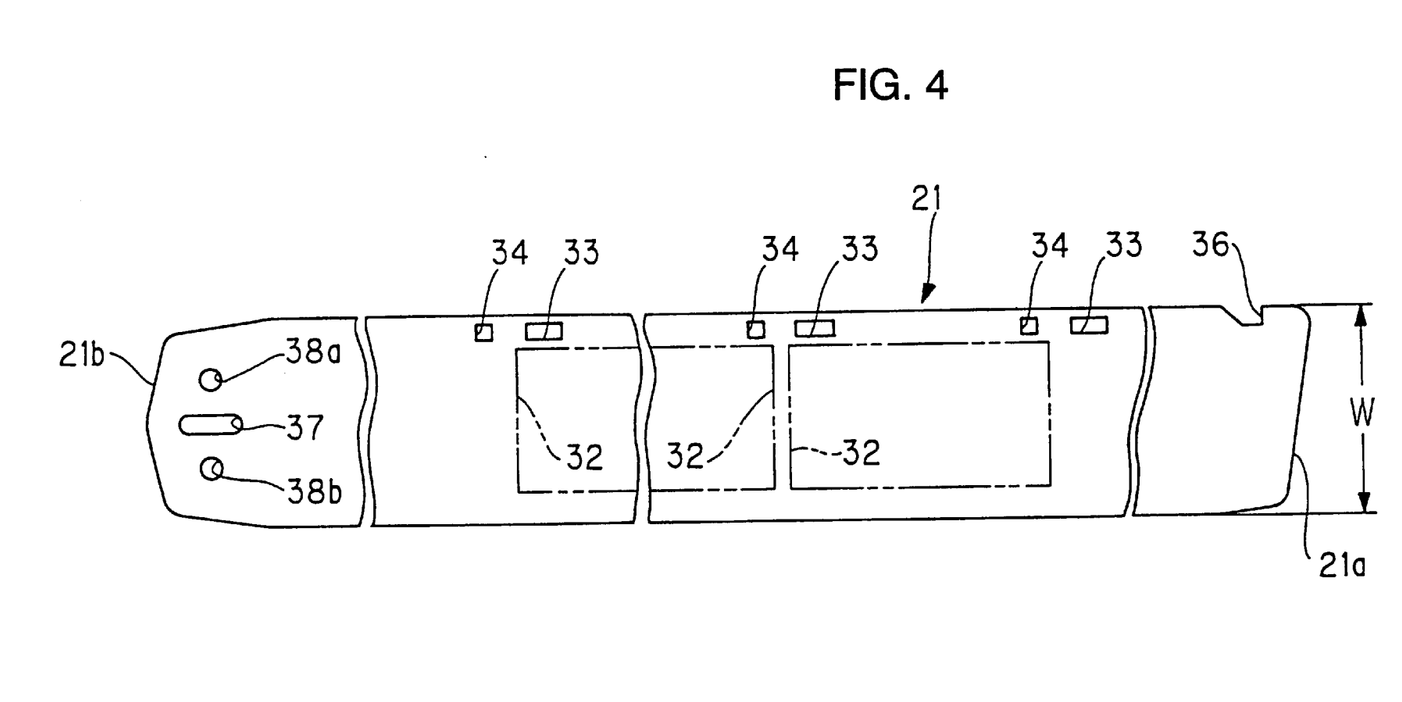
FIG. 4 is an illustration of a new format film strip offered for an integrated photographic system.

As seen in FIG. 4 illustrating the new format film strip 21 broken into three parts for illustration purpose only, the film strip 21 has a width W of approximately 24 mm, significantly narrower than the conventional 135 format film strip. The film strip 21 includes a number of standard image frames 32 having an aspect ratio of 16:9, which is conventionally called a wide image frame. Formed in the side margin of the film strip 21 along its overall length are perforations 33 and 34 of alternate arrangement of two different sizes, i.e. small-sized and large-sized, perforations. One pair of different sizes of perforations for one image frame. Specifically, a small-sized perforation 34, which is the same in size as that of the conventional 135 size film strip, is right beside the forward end of each image frame 32, and a large-sized perforation 33 is right beside the rearward end of the image frame 32.

The film strip 21 is formed with a side notch 36 in close proximity to the leading end 21a and an elongated slot 37 and a pair of retaining holes 38a and 38b in close proximity to the trailing end 21b. The side notch 36 is used to smoothly force out the film strip 21 from the negative return cartridge. As will be described later, the elongated slot 37 is used when the film strip 21 is loaded into a negative return cartridge which will be described in detail later. The film strip 21 is attached at the trailing end 21b to a spool of the negative return cartridge by means of engagement between the pair of retaining holes 38a and 38b and a retaining means integrally formed with the cartridge spool which will be described in detail later.

The lens-fitted film unit 2 comprises a unit casing 3 and an ornamental cardboard cover casing 4. The cardboard cover casing 4 has a configuration in conformity with the unit casing 3 and, however, is formed with openings for access to operating members such as a film rewind knob 5 and a shutter button 6 and openings for uncovering a taking lens 7, a view finder 8 and an exposure counter window 9.

Figure 3:
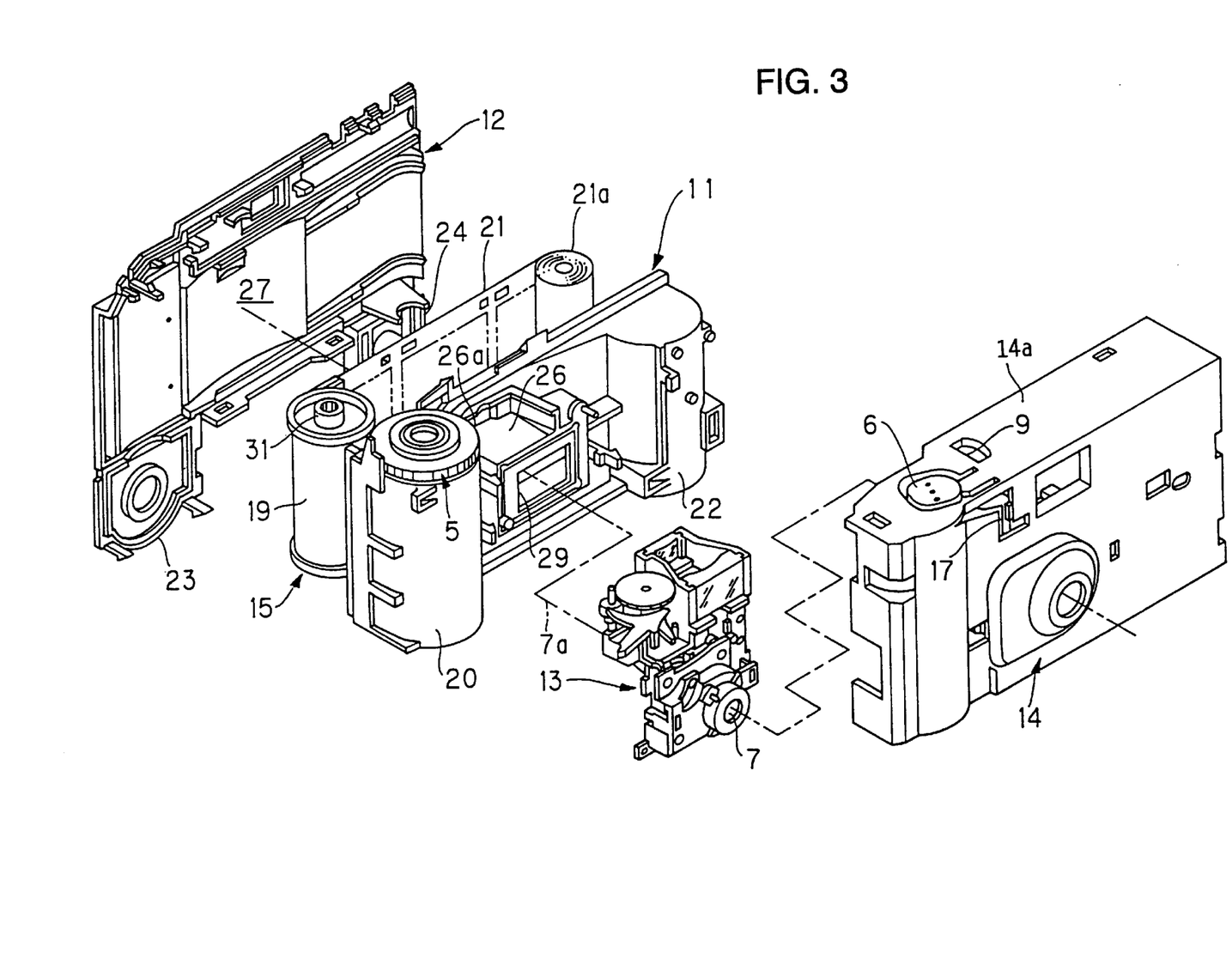
FIG. 3 is an exploded perspective view of the lens-fitted film unit.

As shown in detail in FIG. 3, the unit casing 3 includes a main body section 11, a rear body section 12 and a front body section 14 which are prepared separately and finally assembled together as a light sealed casing. When having assembled the three body sections 11, 12 and 14 to one whole, the unit casing 3 provides a film wind-up or film cartridge chamber 20 and a film supply or film roll chamber 22 between the main body section 11 and rear body section 12 and at opposite sides of the unit casing 3, and provides an exposure chamber 26 between the film wind-up chamber 20 and film supply chamber 22 and between the main body section 11 and front body section 14. During assembling the three body sections 11, 12 and 14 together to the unit casing 3, an integrated exposure unit 13, including a shutter mechanism and a film winding mechanism (which are not shown in the figure and will be described in detail later) therein as well as the taking lens 7, is installed between the main body section 11 and front body section 14. Together, a film strip 21 is loaded over the back of the exposure chamber 26 between the film chambers 20 and 22.

The front body section 14 is formed with a resilient shutter actuating button 6 which is milled out as an integral part of a top wall 14a of the front body section 14. The resilient shutter actuating button 6 is positioned right above a shutter release rod 17 and pushed down so as to be bent down and depress the shutter release rod 17, thereby actuating the exposure mechanism which will be described in detail later.

The main body section 11 is formed at its opposite sides with main portions of the film chambers 20 and 22 opened at bottoms. During assembling the lens-fitted film unit 2, the film cartridge 19 is placed in the main portion of the film wind-up chamber 20, and an unexposed roll 21a of a film strip 21 is placed in the film supply chamber 22. In this instance, one end of the film strip 21 is detachably held by means of a retaining means of a spool of the film cartridge 19, which will be described in detail later. The open bottoms of the film chambers 20 and 22 are closed by flap type bottom covers 23 and 24 integrally formed with the rear body section 12, respectively, when the rear body section 12 is secured to the main body section 11. The bottom cover 23 of the film wind-up chamber 20 is opened or broken when film cartridge 19 is taken out of the unit casing 3. Before opening the bottom cover 23, the ornamental cardboard cover casing 4 may be removed, or otherwise partly torn off.

The exposure chamber 26, positioned between the film chambers 20 and 22, is formed with a rear exposure aperture (which is hidden in the figure) at the back and a front exposure aperture 29 at the front. The rear exposure aperture forms a film guide surface slightly curved about a vertical line perpendicular to the optical axis 7a of the taking lens 7. Similarly, the rear body section 12 is formed with a back support surface 27 slightly curved so as to define a film path with the film guide surface. The front exposure aperture 29 restricts light allowed to pass through to the film strip 21. The exposure chamber 26 has a base plate 50 (see FIG. 6) forming part thereof which in turn mounts the exposure unit 13 thereon. If preferably, the exposure chamber 26 may be formed integrally with the exposure unit 13, or otherwise divided into two halves, the front half of which is integrally formed with the exposure unit 13 and the rear half of which is integrally formed with the main body section, such that the exposure chamber 26 is completed when the exposure unit 13 is attached to the main body section 11.

The exposure chamber 26 is formed at its top with an opening 26a for providing engagement of a driven sprocket wheel 59 (see FIG. 6) with film strip 21. This opening 26a is positioned at an upper left side of the rear exposure aperture as viewed from the taking lens 7.

The film rewind knob 5 is mounted for rotation on the top of the film wind-up chamber 20 and is covered by the top wall 14a of the front body section 14. The rear body section 12 is formed with an opening (not shown) through which the film rewind knob 5 partly projects for access by the user. This film rewind knob 5 has a spool drive shaft 5a (see FIG. 6) which is brought into engagement with a spool 31 of the film cartridge 19 and is rotated in a counterclockwise direction as viewed in FIG. 2 to turn the cartridge spool 31 so as to rewind the film strip 21 into the film cartridge 21 at every exposure.

Figure 6:
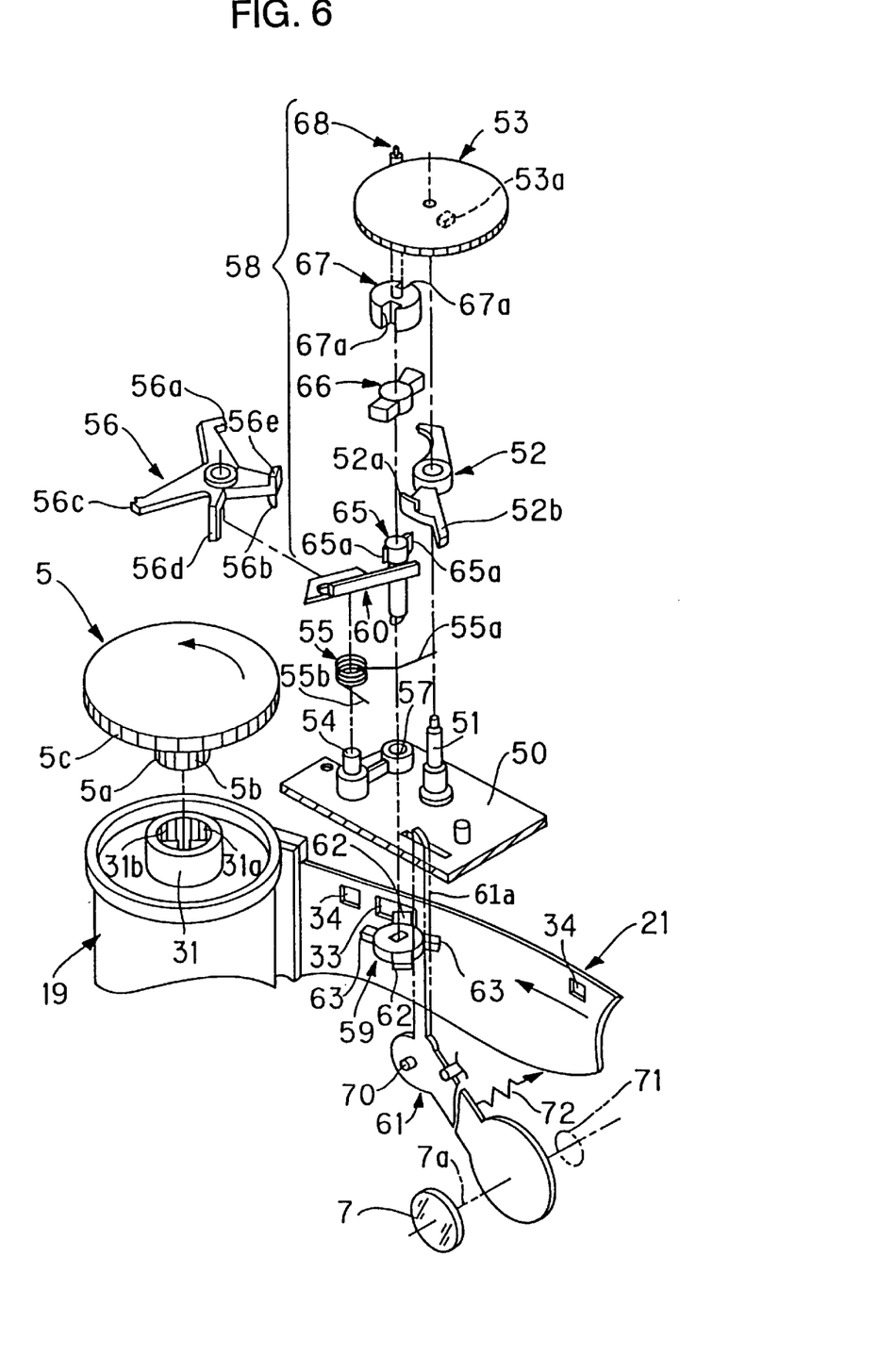
FIG. 6 is an exploded perspective view of a film winding mechanism of the lens-fitted film unit.

FIG. 6 shows details of the exposure unit 13 including at least an exposure control means, such as a shutter mechanism, an automatic filmwind stop mechanism and exposure counter mechanism. Various component elements of the exposure unit 13 are mounted on stationary shafts 51 and 54 extending vertically from the base plate 50 forming part of the exposure chamber 26 and supported by a bearing means 57 secured to the base plate 50. Specifically, a shutter drive lever 52 and an exposure counter disk 53 are mounted on the shaft 51. A torsion spring 55 and a retaining lever wheel 56 is mounted on the shaft 54. Supported for rotation by the bearing are an operationally integrated rotary members 58. The exposure unit 13 further includes a leaf spring 60 and a shutter blade 61, preferably a single blade shutter. The operationally integrated rotary members 58 are operationally linked to the sprocket wheel 59 and the shutter blade 61. The shutter blade 61, pivoted on a pivot shaft 70, is formed with a shutter stem 61a and urged by a return spring 72 toward a charged position shown in FIG. 6.

The operationally integrated rotary members 58 includes a rotary shaft 65 supported for rotation by the bearing 57, a shutter charge cam 66, a filmwind stop cam 67 and a double-toothed gear 68 placed above the base plate 50 which are operationally integrated as one rotary assembly. The rotary shaft 65, directly supported for rotation by the bearing, is formed at its top end with two fingers 65a arranged in diametrically opposite positions and is fixedly attached at its lower end projecting below the base plate 50 with the driven sprocket wheel 59. A leaf spring 60 is in engagement with either one of the fingers 65a so as to urge the rotary shaft 65 in a counterclockwise direction as viewed in FIG. 6 which is the direction in which the driven sprocket wheel 59 is driven by and during film movement.

Specifically, the sprocket wheel 59 has an alternate arrangement of large and small sprocket teeth 33 and 34 arranged at regular angular intervals. In this instance, the sprocket wheel 59 has four teeth, i.e. two large-sized sprocket teeth 62 arranged in diametrically opposite positions which are able to engage with the large-sized perforations 33, and two small-sized sprocket teeth 63 arranged in diametrically opposite positions which are able to engage with the small-sized perforations 34. The sprocket wheel 59 has a base circle whose circumferential length is equal to or slightly less than the length of the image frame of the film strip 21. Each large-sized sprocket tooth 62 has a thickness larger than the length of the small-sized perforation 34 but slightly smaller than the length of the large-sized perforation 33, so as to be bring into engagement with the large-sized perforations 33 only. On the other hand, Each small-sized sprocket tooth 63 has a thickness snugly engageable with the small-sized perforation 34. The sprocket wheel 59 stops when the large-sized sprocket tooth 62 is brought into engagement with any one of the large-sized perforations 33 immediately after disengagement of the small-sized perforation 34 from the small-sized perforation 34 adjacently preceding the large-sized perforations 33. The engagement of the large-sized sprocket tooth 62 with the large-sized perforations 33 stops the film strip 21 with the image frame 32 in a specified correct exposure position.

The leaf spring 60 forces the rotary shaft 65 to turn in the counterclockwise direction, and hence the sprocket wheel 59 when the sprocket wheel 59 is out of engagement with any one of the perforations 33 and 34, so as thereby to place the sprocket teeth 62 and 63 of the sprocket wheel 59 in specified positions where the sprocket teeth 62 and 63 are ready for engagement with a pair of large-sized and small-sized perforations 33 and 34 following advancement of the film strip 21.

The torsion spring 55 urges at its one end 55a the shutter drive lever 52 toward a shutter release position in a counterclockwise direction and at another end 55b the retaining lever wheel 56 to turn in a clockwise direction toward a filmwind stop position where the retaining lever wheel 56 holds a retaining hook 56a abutted against the filmwind stop cam 67. Following a half turn of the operationally integrated rotary members 58, the shutter drive lever 52 is forced by the shutter charge cam 66 in a clockwise direction toward a shutter charge position. The retaining lever wheel 56 brings the retaining hook 56a into engagement with one of diametrical key grooves 67a of the filmwind stop cam 67 every half turn of the operationally integrated rotary members 58. At the moment, the retaining lever wheel 56 is turned slightly in a clockwise direction by the torsion spring 55, bringing a projection 56b of one lever of the retaining lever wheel 56 into engagement with an upright tongue 52a of the shutter drive lever 52 with the result of holding the shutter drive lever 52 in the shutter charge position. Together, the retaining lever wheel 56 brings its filmwind stop lever 56c into engagement with periphery teeth 5c of the film rewind knob 5, prohibiting further film advancement.

Further, following a half turn of the operationally integrated rotary members 58, the double-toothed gear 68 turns the exposure counter disk 53 to change the available exposure number by a decrement of one which is viewed through a see-through counter window 9.

Figure 5:
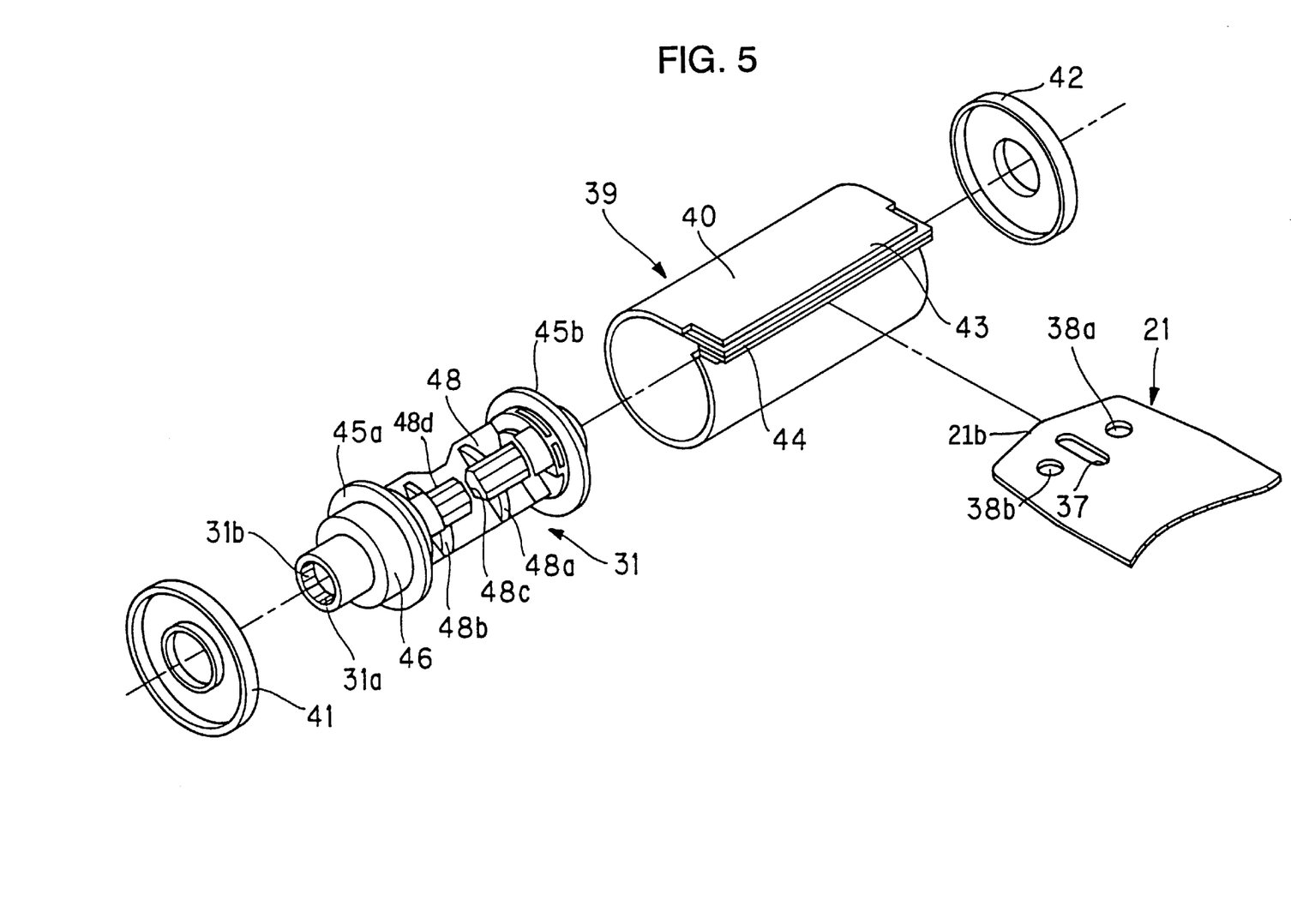
FIG. 5 is an exploded perspective view of a cartridge used in the lens-fitted film unit.

Referring to FIG. 5, the unexposed roll 21 of film strip 21 is attached at its trailing end 21b to the spool 31 of the film cartridge 19. The cartridge spool 31, preferably made of plastics, has a spool core 47 provided with a film retaining means 48 identical in structure and function with a retaining means 84 of the negative return cartridge 75 which will be described in detail later. The spool 31 is formed with upper and lower flanges 45a and 45b separated at an axial distance in conformity with the width W of the film strip 21. The spool 31 is further formed with axial spacer shoulders 46 at outer sides of both upper and lower flanges 45a and 45b, which are designed and adapted so as to fit to the upper and lower walls of the film wind-up chamber 20, thereby preventing the spool 31 from undesirable axial movement.

The spool core 47 is equipped with a film retaining means 48 between the flanges 45a and 45b which must be furnished in conformity with design specifications for the new photographic system. The film retaining means 48 comprises a pair of retaining hooks 48a and 48b separated at a distance equal to the distance between the retaining holes 38a and 38b so as to be easily engaged by the retaining holes 38a and 38b of the film strip 21. The film retaining means 48 further comprises a pair of resilient restraint arms 48c and 48d extending from the flanges 45a and 45b, and overhanging the retaining hooks 48a and 48b, respectively. The restraint arms 48c and 48d prevent disengagement of the trailing end 21b of the film strip 21 from the retaining hooks 48a and 48b. These retaining hooks 48a and 48b and restraint arms 48c and 48d are made as integral parts of the spool core 47.

As was previously described, the spool 31 is formed with a bore 31a with internal teeth 31b with which external teeth 5b of the spool drive shaft 5a (see FIG. 6) of the film rewind knob 5 engage.

After having placed the unexposed roll 21a in the film supply chamber 22 and the spool 31 with the film trailing end attached thereto in the film wind-up chamber 20, the rear body section 12 is secured completing the light-sealed unit casing 3.

While the lens-fitted film unit 3 of the invention has the least requirement for a film strip roll of which one end is attached to and retained by the spool 31 through the retaining means 48 identical in structure and operation with that of the negative return cartridge used in the new photographic system, in order to provide handling convenience of the film strip roll during assembling the lens-fitted film unit 3, the spool 31 is preferably contained in the simple structure of cartridge 19.

In this instance, the cartridge 19 takes a form of a generally cylindrically-shaped film container 39 comprising an open-ended casing 40 and end caps 41 and 42. The casing 40 has egress/ingress lips 43 between which felt strips 44 are tightly grasped to prevent ambient light from entering the interior of the film container 39. The end caps 40 and 41 are fitted to opposite ends by means of labyrinth seal and have openings 41a and 41b for receiving the spool 31 for rotation.

The film container 39 may be similar in size to those for the conventional 135 size films. However, the cartridge 19 structured so as to conform with the new format of film enables the lens-fitted film unit 3 significantly smaller in overall size than those for the conventional 135 size films.

In operation of the lens-fitted film unit 3 thus structured, when depressing the shutter button 6, the shutter release rod 17 is pushed to force the lever 56d in the counterclockwise direction toward the filmwind stop position. Resultingly, the retaining lever wheel 56 brings the projection 56b out of engagement with the upright tongue 52a of the shutter drive lever 52, allowing the shutter drive lever 52 to turn in the counterclockwise direction under the influence of the torsion spring 55, during which a knock arm 52b of the shutter drive lever 52 knocks the shutter stem 61a to turn quickly the shutter blade 61 toward the shutter release position in the clockwise direction. Resultingly, the shutter blade 61 opens an exposure aperture 71 to allow image bearing light to reach the film strip 21. The shutter blade 61 is then quickly returned to the shutter charge position by the return spring 72 so as to shut down the exposure aperture 71.

During the counterclockwise rotation of the retaining lever wheel 56, the retaining lever wheel 56 brings the retaining hook 56a out of engagement from the key groove 67a of the filmwind stop cam 67, allowing advancement of the film strip 21. After the exposure, the film rewind knob 5 is turned in the counterclockwise direction, rewinding and rolling the film strip 21 on film spool 31 by one frame. Simultaneously, the double-toothed gear 68 makes a half rotation through 180 degrees, rotating the exposure counter disk 53 to change the available frame number. This operation is made whenever exposure is made. When all image frames are exposed, the exposure counter disk 53 brings a cam 53a projecting downward therefrom into engagement with a lever 56e of the retaining lever wheel 56 and holds the retaining lever wheel 56 in a position where the retaining lever wheel 56 allows the film strip 21 to advance. Resultingly, the film rewind knob 5 is allowed to turn so as to roll up the whole length of film strip 21 on the spool 31 preferably contained in the film container 39.

The lens-fitted film unit 3 is taken to a photoshop for development and/or printing. Then, the bottom cover 23 of the film wind-up chamber 20 is opened or broken to take out the exposed film roll 21 on the spool 31 in a dark room or the cartridge 19 containing the exposed film roll on the spool 31 in an open room. After having processed the exposed film strip 21, the negative film strip 21 is rolled up into the empty negative return cartridge 75. It is to be noted that this negative return cartridge 75 is essentially designed and furnished as a film cartridge prepared according to the new photographic system and sold with the new format fresh film strip contained therein. For the purpose of rendering the new format film strip exposed in the lens-fitted film unit 2 suitable to enjoy the advantages of the new photographic system, extra empty cartridges are supplied as negative return cartridges. Accordingly, the cartridge is hereafter referred to as a film cartridge.

Figure 7A:
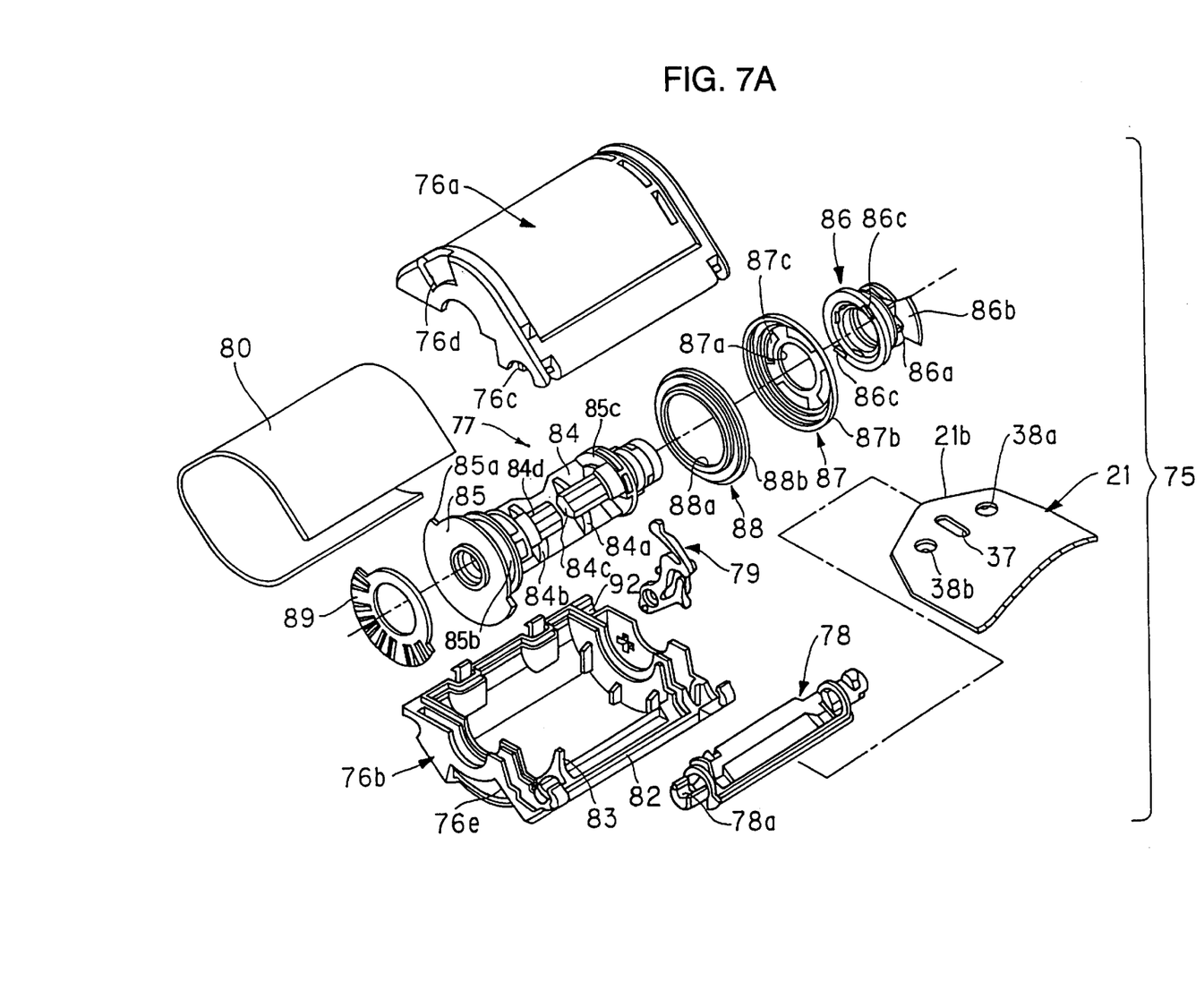
FIG. 7A is an exploded perspective view of a negative return cartridge used in the integrated photographic system.
Figure 7B:
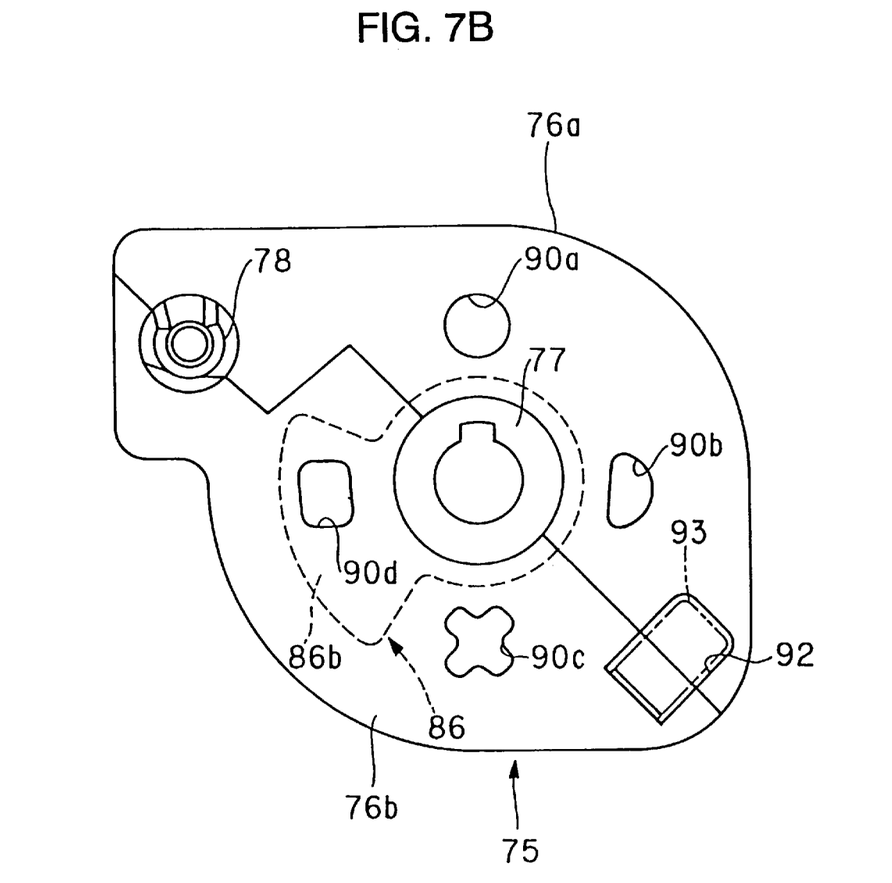
FIG. 7B is a side view of the negative return cartridge.
Figure 7C:
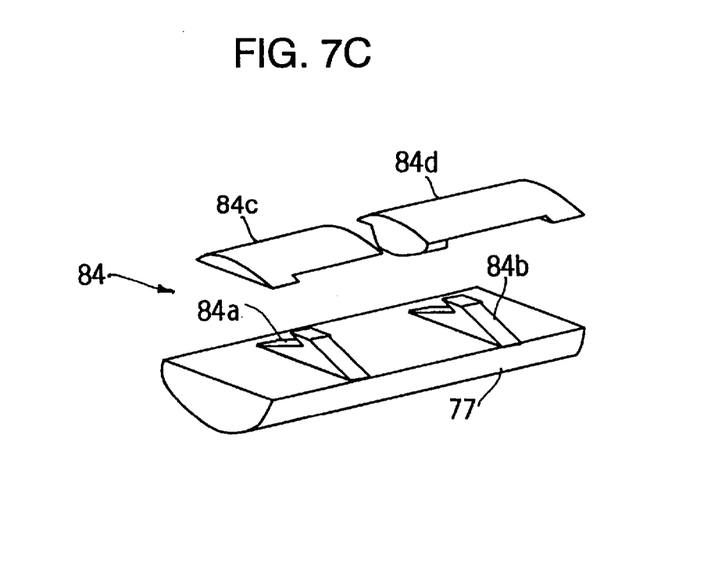
FIG. 7C is a perspective view of a spool retainer means.

FIGS. 7A–7C illustrate the film cartridge 75 in detail. The film cartridge 75 is assembled from two casing halves 76a and 76b, a spool core 77 and a light lock door 78. The casing halves 76a and 76b are joined or coupled to hold the spool core 77 for rotation and to provide the film egress/ingress slot 82 therebetween. Within the interior of the film cartridge 75 in close proximity to the film egress/ingress slot 82 the light lock door 78 is installed so as to open and close the film egress/ingress slot 82. One of the casing halves 76a and 76b, i.e. the casing half 76b is integrally formed with a separator guide 83 in close proximity to the film egress/ingress slot 82 within the cartridge interior for picking up and guiding the leading end of the negative film strip 21 toward the film egress/ingress slot 82.

The cartridge spool core 77 has a spool core 84 provided with an end disk 85 integrally formed with, or otherwise secured to, one end thereof and a rachet wheel 86 with an indicator 86b integrally formed with, or otherwise secured to, another end thereof. The cartridge spool core 77 is further attached with annular wheels 87 and 88 between the end disk 85 and ratchet wheel 86.

As was previously described, the cartridge spool core 77 has the film retaining means 84 which is identical at least in function, and desirably also in structure, with the retaining means 48 of the spool core 31 of the lens-fitted film unit 2. As shown in detail in FIG. 7C, the retaining means 48, which is positioned between the end disk 85 and ratchet wheel 86, comprises a pair of retaining hooks 84a and 84b separated at a distance equal to the distance between the retaining holes 38a and 38b of the film strip 21 so as to be easily engaged by the retaining holes 38a and 38b. The film retaining means 84 further comprises a pair of resilient restraint arms 84c and 84d extending from flanges 85b and 85c, and overhanging the retaining hooks 84a and 84b, respectively. The restraint arms 84c and 84d prevent the trailing end 21b of the film strip 21 from slipping off the retaining hooks 84a and 84b. These retaining hooks 84a and 84b and restraint arms 84c and 84d are made as integral parts of the cartridge spool core 77.

The end disk 85 is attached with a bar code label 89 bearing bar codes, such as optically readable bar codes, representative information of a film strip contained in the film cartridge 75. For allowing access to the bar codes by an optical bar code reader installed in cameras and photoprocessing apparatuses, the film cartridge 75 is provided with an access opening 76c. The end disk 85 is further formed with a cut-out 85a observed through a see-through opening 76e. This cut-out 85a provides an indication of states of the film strip 21 contained in the film cartridge 75.

The ratchet wheel 86 is formed with teeth 86a. The teeth 86a are engaged with a lock lever 79 turned by and during a turn of the light lock door 78 to its closed position so as to prevent the cartridge spool core 77 from rotating. Conversely, the teeth 86a is disengaged from the lock lever 79 during a turn of the light lock door 78 to its open position and allows the cartridge spool core 77 to rotate. The casing half 76a has a lock pole 76c projecting therefrom which is brought into engagement with a groove 78a formed in the light lock door 78 at one of its ends and locks the light lock door 78 in the closed position. The indicator 86b is colored differently from the casing members 76a and 76b so as to be clearly visible. The colored indicator 86b is observed through four differently shaped openings 90a–90d of the film cartridge 75. The respective openings 90a–90d provides indications concerning exposed states of the film strip 21 in the film cartridge 75. Specifically, the opening 90a shows a colored circular symbol which indicates that the film strip 21 is fresh. The opening 90b shows a colored semi-circular symbol which indicates that the film strip 21 is partly exposed and has unexposed frames. The opening 90c shows a colored cross symbol which indicates that the film strip 21 is fully exposed. The opening 90d shows a colored rectangular symbol which indicates that a negative film strip 21 is contained.

The film cartridge 75 is further formed with a tab 93 which is torn off after the exposed film strip is processed so as to open a mechanical access window 92 for verification of processing. The mechanical access window 92 is explored by a probe in an photographic processing apparatus, such as developing apparatuses and printers furnished according to the design specifications for the new photographic system to verify whether the film strip 21 in the film cartridge 75 has been developed or not. If the probe detects the tab 93, it is verified that the film strip 21 has not yet been developed, and detects the tab 93, it is verified that the film strip 21 has been developed.

The annular wheels 87 and 88 having openings 77a and 78a, mounted on the cartridge spool core 77, are formed with lips 87b and 88b, respectively, for retention of the outermost convolution of the film strip 21 rolled up on the cartridge spool core 77. The annular wheels 77 and 78 are made of flexible plastic sheet of less than approximately 0.3 mm so as to be deformed by the film strip 21 when the leading end of the film strip 21 is initially forced out. The annular wheel 87 is further formed with four circular-arcuate slots 87c around the center openings. Each slot 87c receives a ratchet tooth 86c of the ratchet wheel 86. While the cartridge spool 77 turns in a direction in which the film strip 21 is withdrawn from the film cartridge 75, the engagement between the slots 87c and ratchet teeth 86c is maintained so as to allow the annular wheel 87 and spool core 77 to turn jointly. On the other hand, when the cartridge spool 77 turns in a direction in which the film strip 21 is wound up into the film cartridge 75, the ratchet teeth 86c rides over the edges of the slots 87c, the annular wheel 87 rests or stands still. During withdrawing the film strip 21 from the film cartridge 75, the annular wheel 87 rotates accompanying with the cartridge spool 77 with the effect of preventing itself from generating friction force against the cartridge spool 77, enabling the cartridge spool 77 to rotate lightly. Shown by a reference numeral 80 is a product label.

The film cartridge 75 taken out from the camera holds the whole length of film strip 21 rolled up on the spool 77, regardless whether the film strip 21 is fresh, has been fully exposed or partly exposed. Immediately after the film strip 21 is fully rolled up and before the film cartridge is taken out from the camera, the light lock door 78 closes the film egress/ingress slot 82 and is locked by the lock pole 76c, preventing the film strip 21 from being exposed to ambient light. This cartridge is taken to a photoshop for processing or reloaded in the camera for further exposure.

Figure 1:
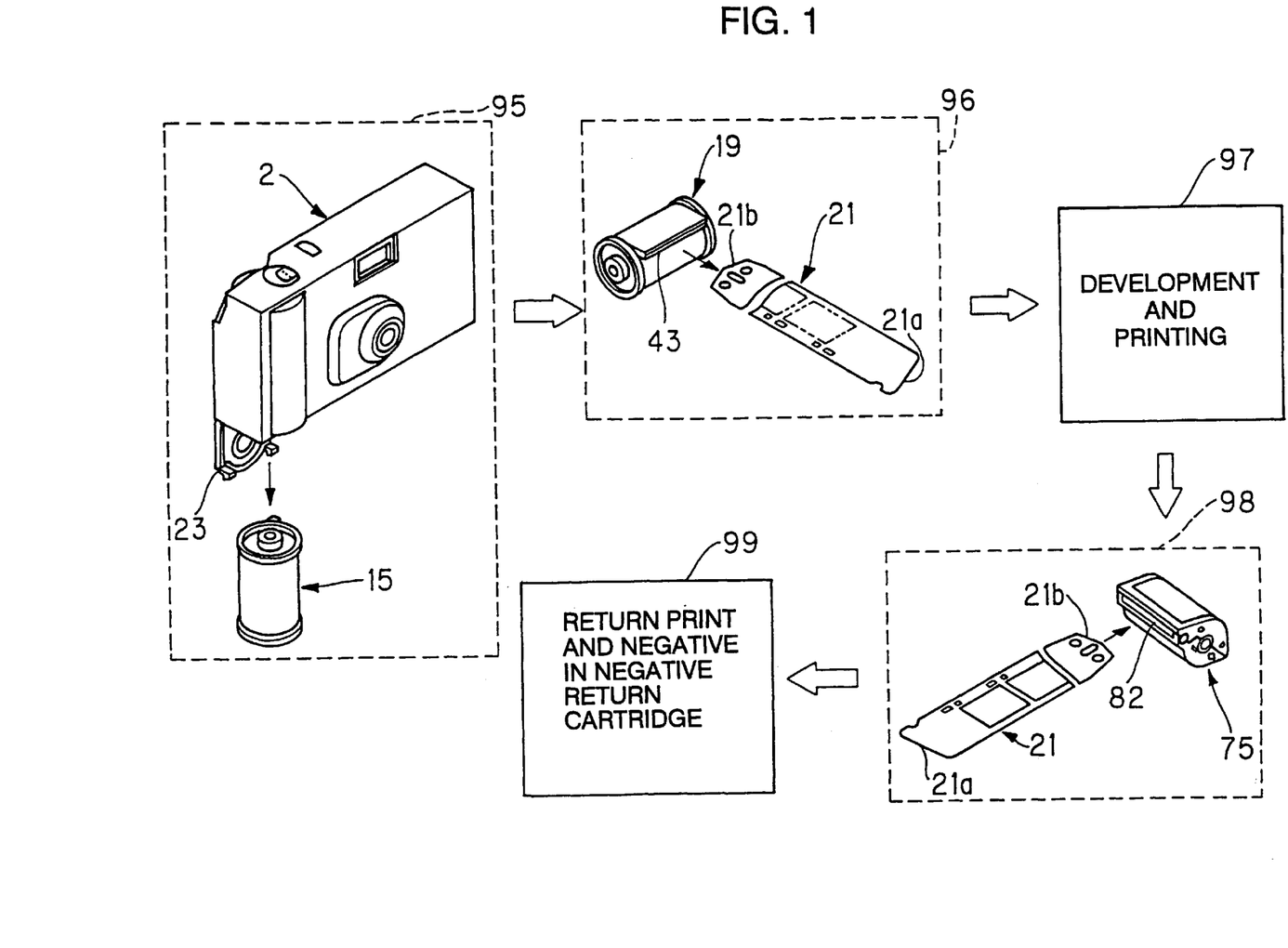
FIG. 1 is an illustration showing the steps of handling a film exposed in a lens-fitted film unit according to an embodiment of the present invention.

On the other hand, the film strip 21 in the lens-fitted film unit 2 is handled as shown in FIG. 1. When the film strip 21 is fully or partly exposed in the lens-fitted film unit 2, the customer takes the lens-fitted film unit 2 to a photoshop for processing and printing. At the photoshop, after taking out the exposed film strip 21 or the cartridge 19 containing the exposed film strip 21 from the lens-fitted film unit casing 2 at at process 95, the film strip 21 is detached from the spool 31 at process 96. Thereafter, the film strip 21 taken out from the lens-fitted film unit 2 is handled in the same way as film strips taken out of film cartridges 75. In order to take out the film strip 21 from the cartridge 19 or 75, the utilization is made of a special flexible detach tool for detaching the film strip 21 from the spool 31. The special detach tool is inserted into the interior of the cartridge 19 through the film egress/ingress lips 43 or slot 82 and detaches off the trailing end 21b of the film strip 21 the retaining means 48 of the spool 31 or the retaining means 84 of the spool 77. The flexible detach tool is pertinently prepared to detach a film strip 21 off from the spool 77 of the film cartridge 75 according to the design specifications for the new photographic system. Further details of the detach tool are described in Japanese Patent Application No. 7-276021 commonly assigned to the applicant of this application and filed on Oct. 24, 1995. After developing and printing at process 97, the negative film strip 21 is loaded in a negative cartridge 75 at process 98. If the film strip 21 is taken out from a film cartridge 75, the negative film strip 21 is reloaded in the original film cartridge 75 as the negative return cartridge. At this time, the trailing end of the negative film strip 21 is reattached to the retaining means 84 of the negative return cartridge. In order to reattach the trailing end 21b to the spool, the utilization is made of a special re-attach tool for re-attaching the film strip 21 to the spool retaining means 84. After capturing the trailing end 21b of the negative film 21 by means of engagement between a finger of the re-attach tool and the elongated slot 37 of the trailing end 21b of the negative film 21, the special re-attach tool is inserted into the interior of the cartridge 19 through the film egress/ingress slot 82 and engages the retaining holes 38a and 38b of the trailing end 21b of the film strip 21 with the retaining means 84 of the spool 77. The re-attach tool is pertinently prepared according to the design specifications for the new photographic system. Further details of the detach tool are described in Japanese Patent Application No. 7-278074 commonly assigned to the applicant of this application and filed Oct. 25, 1995.

Before or after reloading the negative film into the negative return cartridge 75, the tab 93 of the negative return cartridge 75 is torn off to open the mechanical access window 92. Further, the end disk 85 is turned observing the cut-out 85a so as to adjust the colored indicator 86b right below the opening 90d so as to show the colored rectangular symbol, thereby indicates that the cartridge contains a negative film strip 21. The light lock door 78 is closed with the result of locking the spool 77. Thereafter, the negative return cartridge 75 is returned to the customer with prints at process 99.

Whenever extra copies of pictures are requested, the negative return cartridge is put to a photoshop. In spite of the origination of the negative film strip, that is, whether the film strip has been exposed by a lens-fitted film unit or by a camera pertinently prepared for the new photographic system, the negative film is handled as an appropriate one in the new photographic system.

The negative return cartridge 75 is equipped with various functional features and interface mechanisms cooperating with cameras pertinently prepared to the requirements for the new photographic system and is relatively expensive as compared with 135 size cartridges. Accordingly, some interface mechanisms may be removed to specially furnish simplified negative return cartridges for negative films which have been exposed by the lens-fitted film units of the invention.

As apparent from the above description, while the lens-fitted film unit of the invention is available even at a low price, it makes the most of special peculiarities of the new format film and enjoys the advantages of the new photographic system.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. An organized photographic film strip handling system for handling a roll of film of Advanced Photo System film which comprises:

a lens-fitted film unit with a roll of unexposed Advanced Photo System photographic film strip pre-loaded therein and equipped with exposure means for exposure of said film strip, said film strip having a pair of retaining holes in close proximity to a trailing end of the film strip and being separable from the lens-fitted film unit after exposures; and a negative return cartridge for receiving said film strip only after development, said negative return cartridge being equipped with a spool which has a retainer for detachably engaging said trailing end of said film strip through said retaining holes and is rotatable inside the negative cartridge in opposite directions so as to unwind and force said film strip, when fully contained within the negative return cartridge, out of the interior of said negative return cartridge and to wind up said film strip into the interior of said negative return cartridge;

said lens-fitted film unit comprising:
  a light-sealed film container formed with a film wind-up chamber and a film supply chamber disposed at opposite sides of said light-sealed film container and equipped with exposure means disposed between said film wind-up chamber and said film supply chamber;
  a wind-up spool placed in said film wind-up chamber which has a film retainer for detachably retaining said trailing end of said film strip through said retaining holes;
  film wind-up means for rotating said wind-up spool to wind up said film strip on said wind-up spool after every exposure of said film strip; and
  a film cartridge disposed in the film wind-up chamber and within which the wind-up spool is rotatably disposed, the film strip being wound onto the wind-up spool after every exposure, the film cartridge being removable from the light-sealed film container, the film cartridge comprising a generally cylindrically shaped container having a generally circular cross-section made of a thin steel sheet and having light-sealing cloth strips at a film strip egress/ingress slot;

wherein said film cartridge is not capable of permitting movement of said film strip out of said film cartridge by means of reverse rotation of said wind-up spool, and said negative return cartridge is provided with a rotatable door for opening a film strip egress/ingress slot of negative return cartridge to permit movement of said film strip into and out of said spool of said negative return cartridge by means of rotation of said spool of negative said return cartridge and closing said film strip egress/ingress slot.

2. An organized photographic film strip handling system as defined in claim 1, wherein said negative return cartridge is equipped with means for indicating attributes of said negative film strip.

3. An organized photographic film strip handling system for handling a roll of film of the Advanced Photo System type, which comprises:
  a lens-fitted film unit with a roll of unexposed Advanced Photo System photographic film pre-loaded therein and equipped with exposure means for exposure of said film strip, said film strip having a pair of retaining holes in close proximity to a trailing end of the film strip and being separable from the lens-fitted film unit after exposures; and
  a negative return cartridge for receiving said film strip only after development, said negative return cartridge being equipped with a spool which has a retainer for detachably engaging said trailing end of said film strip through said retaining holes and is rotatable inside the negative return cartridge in opposite directions so as to unwind and force said film strip, when fully contained within the negative return cartridge, out of the interior of said negative return cartridge and to wind up said film strip into the interior of said negative return cartridge;

said lens-fitted film unit comprising:
  a light-sealed film container formed with a film wind-up chamber and a film supply chamber disposed at opposite sides of said light-sealed film container and equipped with exposure means disposed between said film wind-up chamber and said film supply chamber;
  a wind-up spool placed in said film wind-up chamber which has a film retainer for detachably retaining said trailing end of said film strip through said retaining holes;
  film wind-up means for rotating said wind-up spool to wind up said film strip on said wind-up spool after every exposure of said film strip; and
  a film cartridge disposed in the film wind-up chamber and within which the wind-up spool is rotatably disposed, the film strip being wound onto the wind-up spool after every exposure, the film cartridge being removable from the light-sealed film container, the film cartridge not comprising a light lock door;

wherein the film cartridge further does not comprise an externally viewable film status indicator mechanism;

wherein said film cartridge is not capable of permitting movement of said film strip out of said film cartridge by means of reverse rotation of said wind-up spool, and said negative return cartridge is provided with a rotatable door for opening a film strip egress/ingress slot of said negative return cartridge to permit movement of said film strip into and out of said spool of said negative return cartridge by means of rotation of said spool of said negative return cartridge and closing said film strip egress/ingress slot.

4. An organized photographic film strip handling system as defined in claim 3, wherein said negative return cartridge is equipped with means for indicating attributes of said negative film strip.

5. An organized photographic film strip handling system for handling a roll of Advanced Photo System (APS) film, said film strip handling system comprising:
  a lens-fitted film unit, said lens-fitted film unit comprising:
    an unprocessed APS film strip disposed within the lens-fitted film unit;
    an in-camera film cartridge disposed within the lens-fitted film unit, said in-camera film cartridge having a film wind-up spool rotatably disposed therein, a trailing end of the unprocessed APS film strip being detachably connected to the film wind-up spool, said in-camera film cartridge also having a film ingress slot adapted to allow the unprocessed APS film strip to pass from an exterior of the in-camera film cartridge to an interior of the in-camera film cartridge;
    an exposure mechanism; and
    a film advance mechanism;
  wherein the in-camera film cartridge containing the film wind-up spool to which the unprocessed APS film strip is detachably connected does not include a rotatable light lock door; and
  a negative return cartridge separate from the in-camera film cartridge, said negative return cartridge comprising:
    a processed APS film strip representing the unprocessed APS film strip subsequent to developing;
    a film wind/unwind spool;
    a film ingress/egress slot; and a rotatable light lock door which, in a first position, closes the film ingress/egress slot and which, in a second position, opens the film ingress/egress slot.

6. The organized photographic film strip handling system of claim 5, wherein the lens-fitted film unit does not comprise a mechanism to actuate the rotatable light lock door.

7. The organized photographic film strip handling system of claim 5, wherein each of the in-camera film cartridge and the negative return cartridge comprises a casing, wherein the casing of the in-camera film cartridge is structurally different from the casing of the negative return cartridge.

8. The organized photographic film strip handling system of claim 5, wherein the lens-fitted film unit, once the APS film strip is contained entirely inside the in-camera film cartridge, can be opened without exposing the APS film strip to ambient light.

9. The organized photographic film strip handling system of claim 8, wherein the in-camera film cartridge seals the film ingress slot against light without external manipulation of the in-camera film cartridge.

10. The organized photographic film strip handling system of claim 8, wherein the in-camera film cartridge does not require external manipulation prior to opening of the lens-fitted film unit.

11. The organized photographic film strip handling system of claim 5, wherein the in-camera film cartridge further comprises light-sealing cloth strips at the film ingress slot, said light-sealing cloth strips preventing light from entering the in-camera film cartridge.

12. The organized photographic film strip handling system of claim 5, wherein the negative return cartridge allows light to enter the negative return cartridge when the rotatable light lock door is in the second position.

13. The organized photographic film strip handling system of claim 5, wherein the negative return cartridge prevents light from entering the negative return cartridge when the rotatable light lock door is in the first position.

14. The organized photographic film strip handling system of claim 7, wherein the lens-fitted film unit does not comprise a mechanism to actuate the rotatable light lock door.

15. The organized photographic film strip handling system of claim 14, wherein the lens-fitted film unit, once the APS film strip is contained entirely inside the in-camera film cartridge, can be opened without exposing the APS film strip to ambient light.

16. The organized photographic film strip handling system of claim 15, wherein the in-camera film cartridge further comprises light-sealing cloth strips at the film ingress slot, said light-sealing cloth strips preventing light from entering the in-camera film cartridge.

17. The organized photographic film strip handling system of claim 16, wherein the negative return cartridge allows light to enter the negative return cartridge when the rotatable light lock door is in the second position, and wherein the negative return cartridge prevents light from entering the negative return cartridge when the rotatable light lock door is in the first position.

* * * * *